United States Patent [19]

Shibukawa

[11] 4,108,131

[45] Aug. 22, 1978

[54] CAPACTIVE DISCHARGE IGNITION CIRCUIT

[75] Inventor: Suetaroo Shibukawa, Ibaraki, Japan

[73] Assignee: Hitachi, Ltd., Japan

[21] Appl. No.: 720,640

[22] Filed: Sep. 7, 1976

[30] Foreign Application Priority Data

Sep. 5, 1975 [JP] Japan .................................. 50-107015

[51] Int. Cl.$^2$ .............................................. F02P 1/00
[52] U.S. Cl. ............................................. 123/148 CC
[58] Field of Search .......................... 310/70 A, 70 R; 123/148 E, 148 CC

[56] References Cited

U.S. PATENT DOCUMENTS

| | | | |
|---|---|---|---|
| 3,646,667 | 3/1972 | Sanisch | 123/148 CC |
| 3,704,700 | 12/1972 | Wesemeyer | 123/148 CC |
| 3,704,701 | 12/1972 | Struber | 123/148 CC |
| 3,866,589 | 2/1975 | Haubner | 123/148 CC |
| 3,933,139 | 1/1976 | Beeghly | 123/148 CC |
| 4,010,726 | 3/1977 | Kondo | 123/148 CC |

*Primary Examiner*—Ronald B. Cox
*Attorney, Agent, or Firm*—Craig & Antonelli

[57] ABSTRACT

A capacitive discharge ignition circuit for an internal combustion engine employs a magneto generating an alternating voltage, synchronized with the operation of the engine, across its output terminals. One of the output terminals is connected to a storage capacitor which is charged during the first half cycle of the output voltage of the magneto. A thyristor is provided for forming a discharging circuit for the storage capacitor together with a primary winding of a spark plug transformer which produces a high voltage impulse across a secondary winding. The other terminal of the magneto is connected to a resistor, across which the voltage appears during the second half cycle, and to the thyristor through a diode. The voltage across the resistor is applied to the gate of the thyristor. The voltage applied to the gate is coupled to ground through the diode and the thyristor when the thyristor is fired.

15 Claims, 8 Drawing Figures

CAPACITIVE DISCHARGE IGNITION CIRCUIT

BACKGROUND OF THE INVENTION

1. Field of the Invention

The present invention relates to a capacitive discharge ignition circuit for an internal combustion engine, particularly to a controlling circuit for firing a thyristor of a capacitive discharge ignition circuit.

2. Description of the Prior Art

Many types of ignition circuits have been developed for supplying high voltage impulses to ignite the combustible airfuel mixture within the cylinders of an internal combustion engine. An example of various ignition circuits utilizing a storage capacitor is disclosed in U.S. Pat. No. 3,851,636. In the ignition circuitry of the patent, a capacitor is charged during the positive half cycle of the alternating current produced by a magneto, and is discharged through a thyristor fired at a certain timing during the negative half cycle of the alternating current. In the ignition circuitry, a further thyristor must be provided in order to control the ignition of the thyristor through which the storage capacitor is discharged. Generally thyristors are very expensive as compared to diodes. It is, therefore, desirable that the number of necessary thyristors be as small as possible.

SUMMARY OF THE INVENTION

An object of the present invention is to provide an improved capacitive discharge ignition circuit for an internal combustion engine in which only one thyristor is utilized.

The above mentioned object has been achieved by a capacitive discharge ignition circuit comprising a magneto operably connected to the engine, a spark plug transformer having primary and secondary windings, a storage capacitor charged during the first half cycle of the voltage of the magneto, a thyristor for forming a discharge circuit for the storage capacitor together with the primary winding, a resistance across which the voltage appears during the second half cycle, the voltage across the resistance being applied to the gate of the thyristor, and means for removing the voltage from the gate once the thyristor is fired.

DETAILED DESCRIPTION

Figure 1:
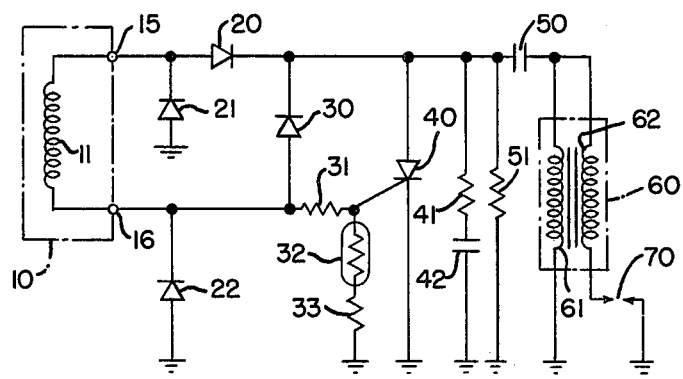
FIG. 1 is a schematic diagram of an ignition circuit according to the invention.

Referring now to FIG. 1, there is shown a schematic diagram of a magneto 10 having magnetic pole pieces (not shown) mounted either in a rotor or in a flywheel of an internal combustion engine. The engine of this embodiment operates at a predetermined constant rotating speed, such as the engine for a lawn mower. The turns of a winding 11 of the magneto 10 are so selected that the magneto 10 generates a certain output voltage at a predetermined constant rotating speed of the engine.

One of two output terminals 15 of magneto 10 is connected to the cathode of a diode 21 and the anode of a diode 20, and the other output terminal 16 thereof is connected to the cathode of a diode 22 and the anode of a diode 30. The anodes of the diodes 21 and 22 are connected to ground, and the cathodes thereof are connected to one end of a storage capacitor 50 through the diodes 20 and 30 respectively. The other end of the storage capacitor 50 is connected to ground through a primary winding 61 of a spark plug transformer 60 which produces high voltage impulses across a secondary winding 62 in response to discharge current fllowing through the primary winding 61. The high voltage impulses across the secondary winding 62 of the spark plug transformer 60 produces a spark across the electrodes of spark plug 70 to ignite the combustible air-fuel mixture within a cylinder (not shown) of the internal combustion engine. A resistor 51 of large resistance, such as 3MΩ, is connected between ground and the one end of the storage capacitor 50. The time constant determined by the storage capacitor 50 and the resistor 51 is so large that the charge voltage of the storage capacitor is not affected during the engine operation by the discharge therethrough. After the engine is stopped, the storage capacitor 50 discharges through the resistor 51 gradually in accordance with their time constant.

A thyristor 40 is connected between the storage capacitor 50 and ground with the cathode and the anode thereof being connected to ground and the one end of the storage capacitor 50, respectively. A high frequency bypass circuit consisting of a resistor 41 and a capacitor 42 is connected between ground and the anode of the thyristor 40. The thyristor 40 tends to be turned on by high frequency voltages supplied to the anode thereof. Such a disadvantage is eliminated by the function of the high frequency pass circuit; that is, the high frequency voltage which is induced by a circumferential electric wave passes through the frequency pass circuit.

The other input terminal 16 of the magneto 10 is connected to the gate of the thyristor 40 through a resistor 31. A resistance consisting of a thermistor 32 and a resistor 33 which are connected in series with each other is connected between ground and the gate of the thyristor 40. The thermistor 32 is provided for compensation for the change in the gate voltage, to turn on the thyristor 40 due to the change in surrounding temperature.

Figure 2:
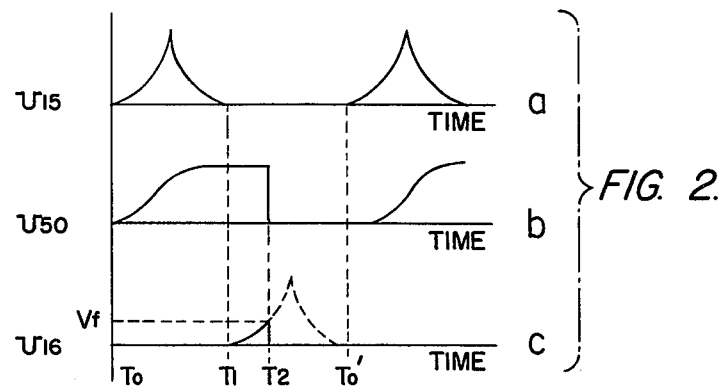
FIG. 2(a-c) shows waveforms at various locations of the ignition circuit shown in FIG. 1.

In the operation of the above ignition circuit, the magneto 10 generates output voltages $V_{15}$ and $V_{16}$ at the output terminals 15 and 16 as shown in FIGS. 2a and 2c, respectively. During the period between points $T_0$ and $T_1$, current flows through diode 22, the winding 11 of the magneto 10, the diode 20, the storage capacitor 50 and primary winding 61 of the spark plug transformer 60, thereby charging the storage capacitor 50. The waveform of the voltage $V_{50}$ across the storage capacitor 50 is shown in FIG. 2b. During the period of $T_0$ through $T_1$ no current flows through the resistor 31, the thermistor 32 and the resistor 33, and the flow of current from the one output terminal 15 to the other output terminal 16 of the magneto 10 is prevented by the diode 30. The voltage across the resistance consisting of the thermistor 32 and the resistor 33 does not rise to a value sufficient to turn on the thyristor 40, so that no current flows through the thyristor 40. The small current which flows through the prmiary winding 61 of the spark plug transformer 60 during this period produces a small voltage across the secondary winding 62 thereof. As shown in FIG. 2b, however, the voltage $V_{50}$ across the capacitor 50 during this period increases gradually so that the voltage produced across the secondary winding 62 of the spark plug transformer 60 is insufficient to produce a spark across the electrodes of the spark plug 70. The voltage $V_{50}$ across the storage capacitor 50 builds up to a steady value and remains constant thereafter.

During the period between point $T_1$ and $T_0'$, current flows through the diode 21, the winding 11 of the magneto 10, the resistor 31, the thermistor 32 and the resistor 33. During this period, current flow from the other output terminal 16 through the diode 30 to the one output terminal 15 of the magneto 10 is prevented by the diode 20.

Current which flows through the diode 30, the storage capacitor 50 and the primary winding of the spark plug transformer 60 hardly flows since the storage capacitor 50 has been almost charged by the end of last previous period. The current which flows through the resistor 31, the thermistor 32 and the resistor 33 increases with the increase of the output voltage $V_{16}$, while the voltage applied to the gate of the thyristor 40 increases in value as shown in FIG. 2c. The voltage applied to the gate of the thyristor 40 is positive with respect to the cathode of the thyristor 40. When the voltage $V_{16}$ increases up to a voltage value $V_f$ at the time point $T_2$ as shown in FIG. 2c, the thyristor 40 is rendered conductive. At this point the storage capacitor 50 instantaneously discharged through the thyristor 40 and the primary winding 61 of the spark plug transformer 60. A high voltage pulse due to the discharging current which is sufficient to produce a spark between the electrodes of the spark plug 70 is produced across the secondary winding 62 of the spark plug tranformer 60.

When the thyristor 40 is conductive, the anode of the diode 30 is coupled to ground through the thyristor 40. Current from the other output terminal 16 of the magneto 10 flows through the diode 30 and the thyristor 40 to ground. The value of the voltage applied to the gate of the thyristor 40 is therefore reduced to ground. The thyristor 40 is rendered nonconductive prior to the succeeding period.

Figure 3:
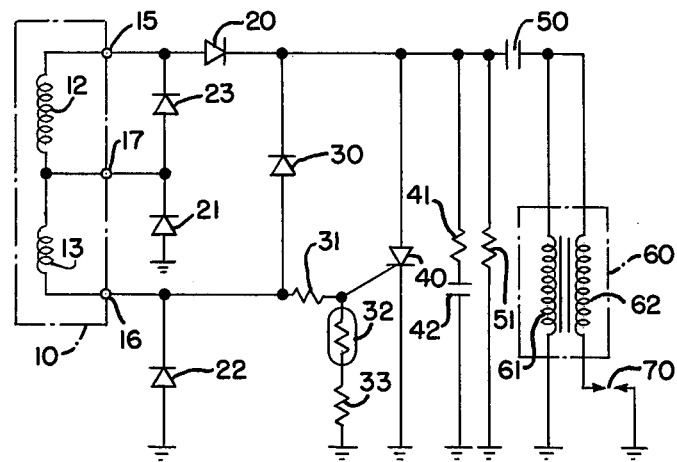
FIG. 3 is a schematic diagram of an embodiment utilizing another type of magneto.

Referring now to FIG. 3, there is shown a schematic of a magneto of another type having a high-turn winding 12 and a low-turn winding 13 which are connected in series with each other. This type of magneto is suitable for an internal combustion engine operating over a large range of speed. As the rotating speed of the magnetic pole pieces (not shown) mounted in the rotor of the engine increases, the charge output for a single revolution decreases. The total energy transferred by way of the magnetic field to the winding for any revolution is approximately constant. However, at higher rotating speeds, a higher voltage and a smaller charge output are obtained. Furthermore, the larger the number of turns of a winding, the higher the voltage and lower the charge output. The current output of the magneto during one revolution is critical, since a definite amount of charge is necessary to change the capacitor to a particular voltage. Of course, the voltage from the magneto must be sufficient to charge the capacitor. Hence, by having two windings of unequal turns, sufficient current and voltage is assured over a large range of speed.

In this embodiment, the ignition circuit shown in FIG. 1 is adapted to the magneto 10 of another type having two windings 12 and 13 of unequal turns. As is shown in FIG. 3, a diode 23 is further provided between the diode 21 and the output terminal 15 of the magneto 10 with the anode thereof being connected to the output terminal 15 and the cathode of the diode 23 being connected to an intermediate output terminal 17 between the two windings 12 and 13 of the magneto 10.

Figure 4:
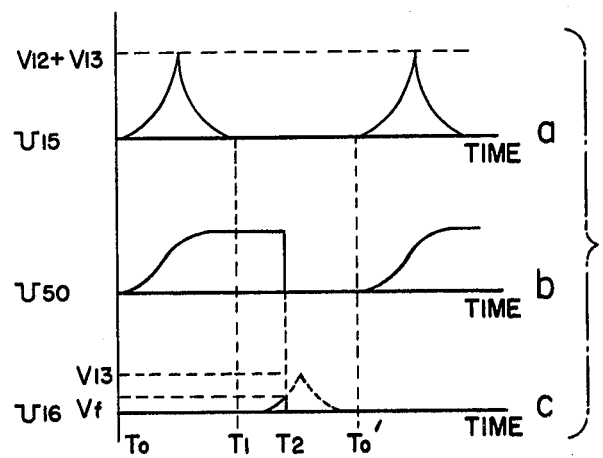
FIG. 4(a-c) shows waveforms at various locations of the ignition circuit shown in FIG. 3.

The circuit of this embodiment shown in FIG. 3 operates as follows. During the period $T_0$ through $T_1$, current flows through the diode 22, the two windings 13 and 12 of the magneto 10, the diode 20, the storage capacitor 50 and the primary winding 61 of the spark plug transformer 60. The voltage $V_{15}$ across the two windings 13 and 12, therefore, changes the storage capacitor 50, as shown in FIGS. 4a and 4b. During the period $T_1 - T_0'$, current flows through the diode 21, the low-turn winding 13, the resistor 31, the thermistor 32 and the resistor 33. At the same time, current from the intermediate output terminal 17 flows through the diode 23 to the one output terminal 15. Therefore, the voltage across the high-turn winding 12 is short-circuited and only the voltage across the low-turn winding 13 is produced at the other output terminal 16, as shown in FIG. 4c.

Figure 5:
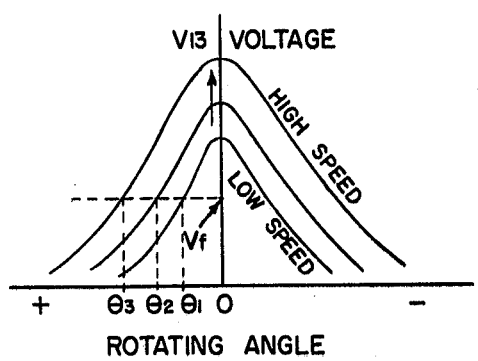
FIG. 5 shows waveforms of the output voltage which is generated at the other output terminal of the magneto shown in FIG. 3.
Figure 6:
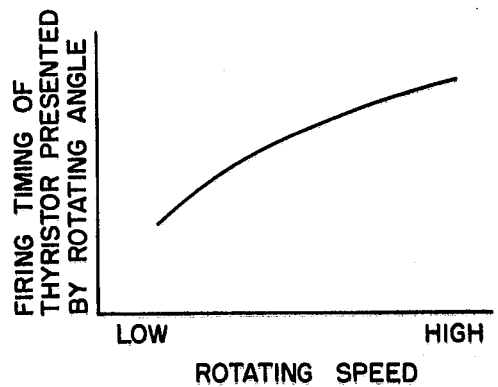
FIG. 6 shows characteristic of firing timing of the thyristor in the ignition circuit shown in FIG. 3.

In FIG. 5, there are shown waveforms of the voltage $V_{16}$ produced at the other output terminal 16 with respect to the rotating angle of the pole piece against the winding 13. The peak of the voltage $V_{16}$ increases proportionally to the increase of the rotating speed of the engine. The thyristor 40 is fired when the voltage $V_{16}$ reaches the voltage $V_f$. Thus, the higher the rotating speed of the engine becomes, the faster the voltage $V_{16}$ builds up to the voltage $V_f$ sufficient to fire the thyristor 40. The timing when the thyristor 40 is fired, therefore, is advanced according to the increase of the rotating speed of the engine as shown in FIG. 6.

Figure 7:
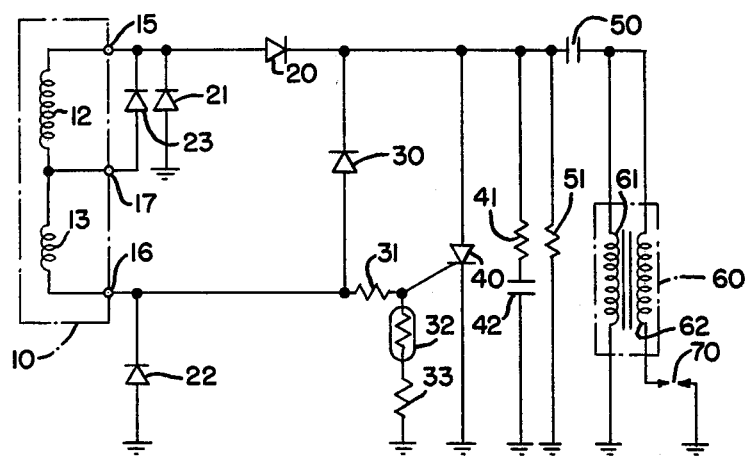
FIG. 7 is a schematic diagram of another embodiment utilizing another type of magneto.

Referring to FIG. 7, there is shown another embodiment utilizing the magneto 10 of another type having the high and low turn windings 12 and 13. This embodiment is suitable for an automobile engine. It is well known that the temperature within the cylinder of the engine increases in accordance with the increase of the rotating speed of the engine. However, too large an increase of the temperature within the cylinder results in many known disadvantages. The most important one of these is that the quantity of nitrogen oxides contained in the exhaust gas from the internal combustion engine increases. For eliminating such a disadvantage, the ignition timing of the spark plug is retarded in the high range, e.g. 2500 rpm, of the rotating speed of the engine.

In this circuit, diode 23 is provided between the output terminals 15 and 17 of the magneto 10 and the diode 21 is connected between the output terminal 15 and ground as shown in FIG. 7. The thyristor 40, the storage capacitor 50, etc. are constructed in the same way as shown in FIG. 1.

In the operation of the above-mentioned circuit, during the period when the voltage $V_{15}$ generated at the one output terminal 15 of the magneto 10 is positive, current flows through the diode 22, the high-and low-turn windings 13 and 12, the diode 20, the storage capacitor 50 and the primary winding 61 of the spark plug transformer 60. The storage capacitor 50 is charged in the same manner as that described previously in connection with FIG. 3. During the period when the voltage $V_{16}$ generated at the other output terminal 16 of the magneto 10 is positive, current flows through diode 21, the high-turn winding 12 and the low-turn winding 13 of the magneto 10, the resistor 31, the thermistor 32 and the resistor 33. The voltage across the high-turn winding 12 is short-circuited by the diode 23, so that only the voltage across the low-turn winding 13 appears at the other output terminal 16 as the voltage $V_{16}$. The current flowing through the thermistor 32 and the resistor 33 is retarded by the reactance of the high-turn winding 12. Therefore, the voltage applied to the gate of the thyristor 40 is retarded.

Figure 8:
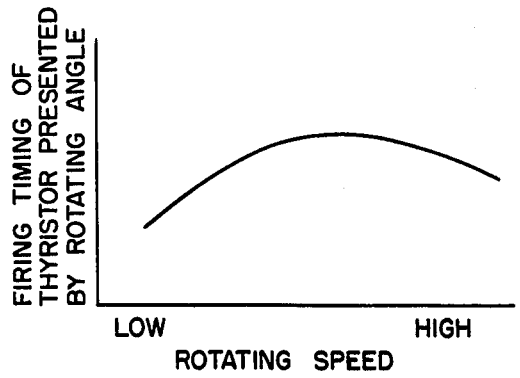
FIG. 8 shows the characteristic of firing timing of the thyristor in the ignition circuit shown in FIG. 7.

As the rotating speed of the magnetic pole pieces mounted in the rotor of the engine increases, the voltage $V_{16}$ generated at the other output terminal 16 increases. On the other hand, the higher the rotating speed of the magnetic pole pieces, the greater is the retardation of the current flowing through the high-turn winding 12. Therefore, the timing when the thyristor 40 is fired is advanced according to the rotating speed of the engine in lower range, and retarded in high range as shown in FIG. 8.

While I have shown and described several embodiments in accordance with the present invention it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A capacitive discharge ignition circuit for an internal combustion engine comprising:
    a magneto operably connected to the engine and having at least one winding;
    a spark plug transformer having primary and secondary windings;
    a storage capacitor connected to said magneto winding for being charged with the output voltage of said magneto during the first half cycle thereof;
    a thyristor connected to said storage capacitor for forming a discharge circuit for said storage capacitor together with said primary winding;
    resistance means connected to the gate of said thyristor across which the voltage appears during the second half cycle, the voltage across said resistance means being applied to the gate of said thyristor;
    a diode for forming a closed circuit together with said thyristor and said resistance means so as to remove the voltage from said gate once said thyristor is fired; and
    further comprising a diode connected between said magneto winding and a reference potential so that it conducts thereby inhibiting the output of said magneto winding from being applied to said resistance means during the first half cycle.

2. A circuit as claimed in claim 1, wherein said resistance means includes a thermistor.

3. A circuit as claimed in claim 1, wherein said magneto has a main winding and a further winding connected in series with said main winding, the number of turns of said further winding being larger than that of said main winding.

4. A capacitive discharge ignition circuit for an internal combustion engine comprising:
    a magneto operably connected to the engine, said magneto having
        a main winding,
        a further winding connected in series with said main winding, the number of turns of said further winding being larger than that of said main winding, and
        means for short-circuiting said further winding during the second half cycle of said magneto voltage;
    a spark plug transformer having primary and secondary windings;
    a storage capacitor connected to said magneto winding for being charged with the output voltage of said magneto;
    a thyristor connected to said storage capacitor for forming a discharge circuit for said storage capacitor together with said primary winding;
    the size of said storage capacitor and the windings of said magneto being set so as to limit charging of said storage capacitor to the first half cycle of the voltage produced across said winding;
    resistance means connected to the gate of said thyristor across which the voltage appears during the second half cycle, the voltage across said resistance means being applied to the gate of said thyristor, and
    further comprising a diode for forming a closed circuit together with said thyristor and said resistance means so as to remove the voltage from said gate once said thyristor is fired.

5. A circuit as claimed in claim 4, wherein said short-circuiting means is a diode which is connected in parallel with said further winding.

6. A circuit as claimed in claim 4, further comprising means for permitting only the voltage produced across said main winding during the second half cycle to be applied directly to said resistance means.

7. A circuit as claimed in claim 4, further comprising means for permitting only the voltage produced across said main winding during the second half cycle to be applied to said resistance means through said short-circuited further winding.

8. A circuit as claimed in claim 1, wherein said diode is coupled in series between the anode and gate of said thyristor.

9. A circuit as claimed in claim 3, further comprising means for permitting only the voltage produced across said main winding during the second half cycle to be applied directly to said resistance means.

10. A circuit as claimed in claim 4, further comprising:
    means for permitting the current flowing to said resistance means to flow through said main winding but not through said further winding during said second half cycle.

11. A circuit as claimed in claim 10, wherein said means for permitting current to flow is a diode with its anode connected to ground potential and its cathode connected between said main and further windings.

12. A circuit as claimed in claim 3, further comprising:
    means for permitting the current flowing to said resistance means to flow through said main winding but not through said further winding during said second half cycle.

13. A circuit as claimed in claim 12, wherein said means for permitting current to flow is a diode with its anode connected to ground potential and its cathode connected between said main and further windings.

14. A circuit as claimed in claim 4, further comprising:
means for permitting current to flow through said winding and said short-circuited further winding during said second half cycle so that the current is retarded by the reactance of said further winding but only the voltage produced across said main winding is applied to said resistance means.

15. A circuit as claimed in claim 14, wherein said means for permitting the current in said resistance means to flow comprises a diode with its anode connected to ground potential and its cathode connected to the end of said further winding not connected to said main winding.

* * * * *